US007237760B1

(12) United States Patent
Chiu

(10) Patent No.: US 7,237,760 B1
(45) Date of Patent: Jul. 3, 2007

(54) CHECK VALVE ACTUATOR

(76) Inventor: Ching-Su Chiu, No. 327, Peng Yi Rd., Taiping City, Taichung Hsien (TW)

( * ) Notice: Subject to any disclaimer, the term of this patent is extended or adjusted under 35 U.S.C. 154(b) by 12 days.

(21) Appl. No.: 11/341,348

(22) Filed: Jan. 28, 2006

(51) Int. Cl.
*F16L 37/28* (2006.01)

(52) U.S. Cl. ............. 251/264; 137/614.03; 137/614.05

(58) Field of Classification Search ............... 137/614, 137/614.03, 614.04, 614.05; 251/264, 149.1, 251/149.6
See application file for complete search history.

(56) References Cited

U.S. PATENT DOCUMENTS

| 5,139,049 | A | * | 8/1992 | Jensen et al. | 137/614.05 |
| 5,370,359 | A | * | 12/1994 | Sadegh et al. | 137/614.15 |
| 5,409,039 | A | * | 4/1995 | Mock | 137/614.05 |
| 5,415,200 | A | * | 5/1995 | Haunhorst et al. | 137/614.05 |
| 5,586,748 | A | * | 12/1996 | Kish | 137/614.04 |
| 6,041,818 | A | * | 3/2000 | Schadewald et al. | 251/264 |
| 6,637,460 | B2 | * | 10/2003 | Haunhorst | 137/614.03 |
| 6,991,216 | B1 | * | 1/2006 | Wilson | 251/264 |

\* cited by examiner

*Primary Examiner*—Kevin Lee
(74) *Attorney, Agent, or Firm*—Pai Patent & Trademark Law Firm; Chao-Chang David Pai

(57) ABSTRACT

A check valve actuator has a body, a sliding seat, a drive shaft, a spring assembly and a knob. The body has a mounting collar, a convex ridge, an internal cavity and a through hole. The mounting collar is formed on the front end of the body and has an internal surface. The internal cavity is formed inside the body. The through hole communicates with the internal cavity. The sliding seat is mounted slidably against the internal surface of the internal cavity and has an annular seat. The drive shaft is extends through the internal cavity and the through hole in the body. The spring assembly is pressed between the closed rear wall of the internal cavity and the annular seat and the drive shaft. The knob is attached to the drive shaft at the rear end of the body.

1 Claim, 5 Drawing Sheets

CHECK VALVE ACTUATOR

BACKGROUND OF THE INVENTION

1. Field of the Invention

The present invention relates to a check valve actuator and more particularly to a check valve actuator that quickly and safely opens a check valve to allow as substance under pressure such as natural gas to flow through the check valve.

2. Description of Related Art

With reference to FIG. 5, a conventional check valve actuator (70) is tubular and has a body (71), a drive shaft (72), a pushrod (73), a discharge fitting (74), a knob (75) and a mounting collar (76).

The body (71) is hollow and has a front end, a rear end, a top, an internal cavity and a discharge port. The discharge port is formed in the top of the body (71) and communicates with the internal cavity.

The drive shaft (72) extends rotatably through the internal cavity from the rear end to the front end of the body (71) and has an outer end, an inner end and an external thread. The external thread is formed around the outer end of the drive shaft (72).

The pushrod (73) is connected to the inner end of the drive shaft (72), selectively protrudes from the front end of the body (71) to press a check valve disk away from a corresponding check valve seat to open the check valve and has an outer end and an inner end. The outer end of the pushrod (73) is attached to the inner end of the drive shaft (72) inside the body (71).

The discharge fitting (74) is tubular and is mounted in the discharge port in the body (71).

The knob (75) is mounted on the outer end of the drive shaft (72) near the rear end of the body (71), selectively extends or retracts the drive shaft (72) from the front end of the body (71) and has a center and a threaded hole. The threaded hole is formed in the center of the knob (75) and screws onto the external thread on the drive shaft (72). When the knob (75) is turned to extend the drive shaft (72), the pushrod (73) presses the check valve disk away from the check valve seat and allow a substance to flow through the check valve and the internal cavity of the body (71) and discharge fitting (74) of the conventional check valve actuator (70). When the knob (75) is turned to retract the drive shaft (72), the pushrod (73) pulls away from the check valve disk, and the check valve closes and stops the substance from flowing.

The mounting collar (76) is cylindrical, is attached to and protrudes longitudinally from the front end of the body (71) around the pushrod (73) and is mounted around a discharge port on a check valve.

However, the check valve actuator (70) has the following defects and shortcomings.

1. To keep the substance from leaking to the atmosphere, the knob (75) must be turned many times to extend and retract the pushrod (73), and this is time-consuming and trouble.

2. The pushrod (73) striking the disk may damage the check valve.

SUMMARY OF THE INVENTION

The main objective of the present invention is to provide a check valve actuator that can be operated quickly and will not damage the check valve.

The check valve actuator has a body, a sliding seat, a drive shaft, a spring assembly and a knob. The body has a mounting collar, a convex ridge, an internal cavity and a through hole. The mounting collar is formed on the front end of the body and has an internal surface. The internal cavity is formed inside the body. The through hole communicates with the internal cavity. The sliding seat is mounted slidably against the internal surface of the internal cavity and has an annular seat. The drive shaft is extends through the internal cavity and the through hole in the body. The spring assembly is pressed between the closed rear wall of the internal cavity and the annular seat and the drive shaft. The knob is attached to the drive shaft at the rear end of the body.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
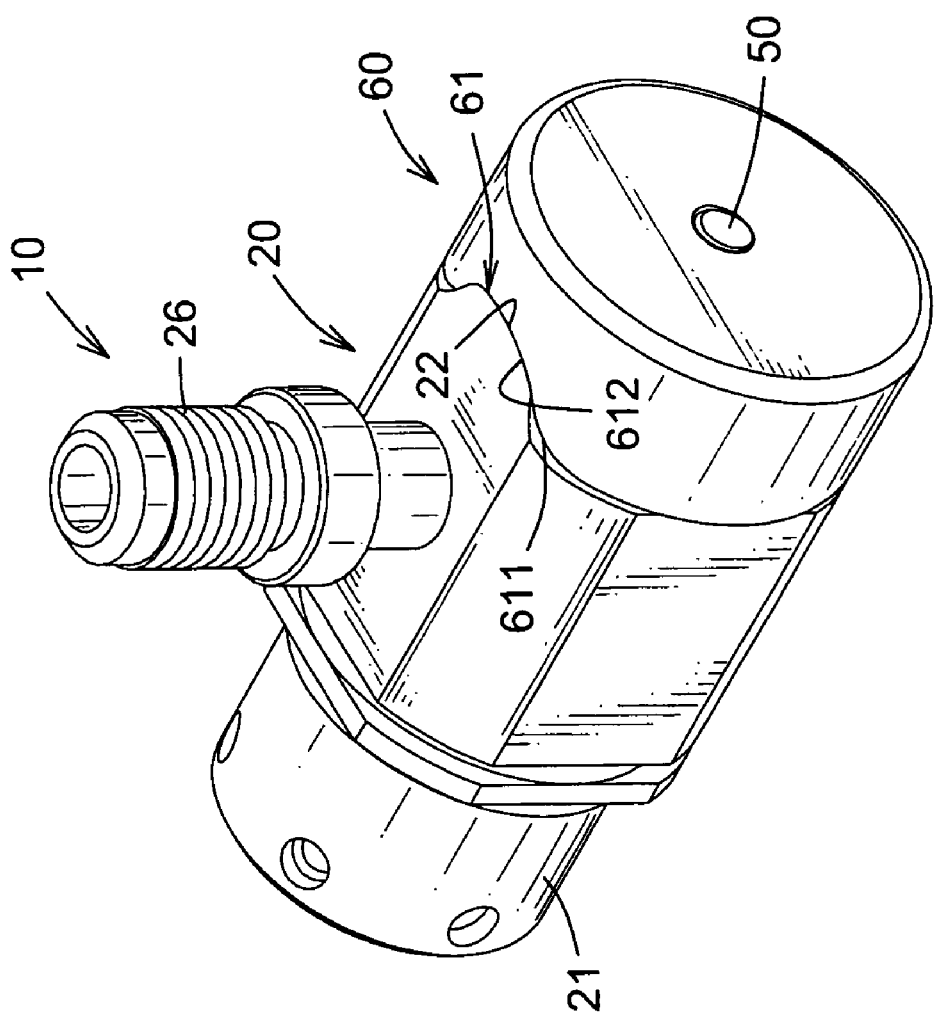
FIG. 1 is a perspective view of a check valve actuator in accordance with the present invention.
Figure 2:
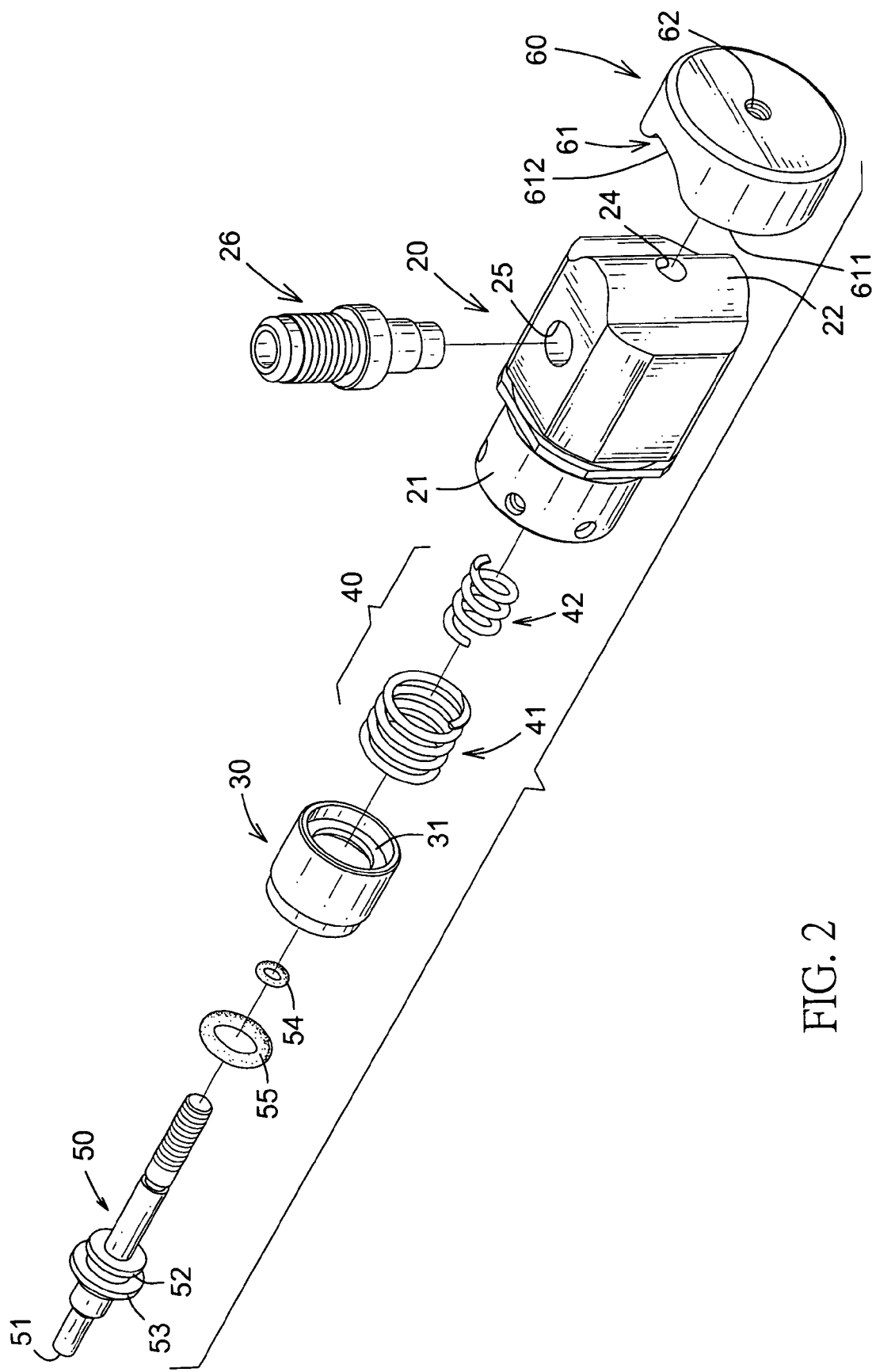
FIG. 2 is an exploded perspective view of the check valve actuator in FIG. 1.

With further reference to FIGS. 1 and 2, the check valve actuator (10) comprises a body (20), a sliding seat (30), a drive shaft (50), a spring assembly (40) and a knob (60).

Figure 3:
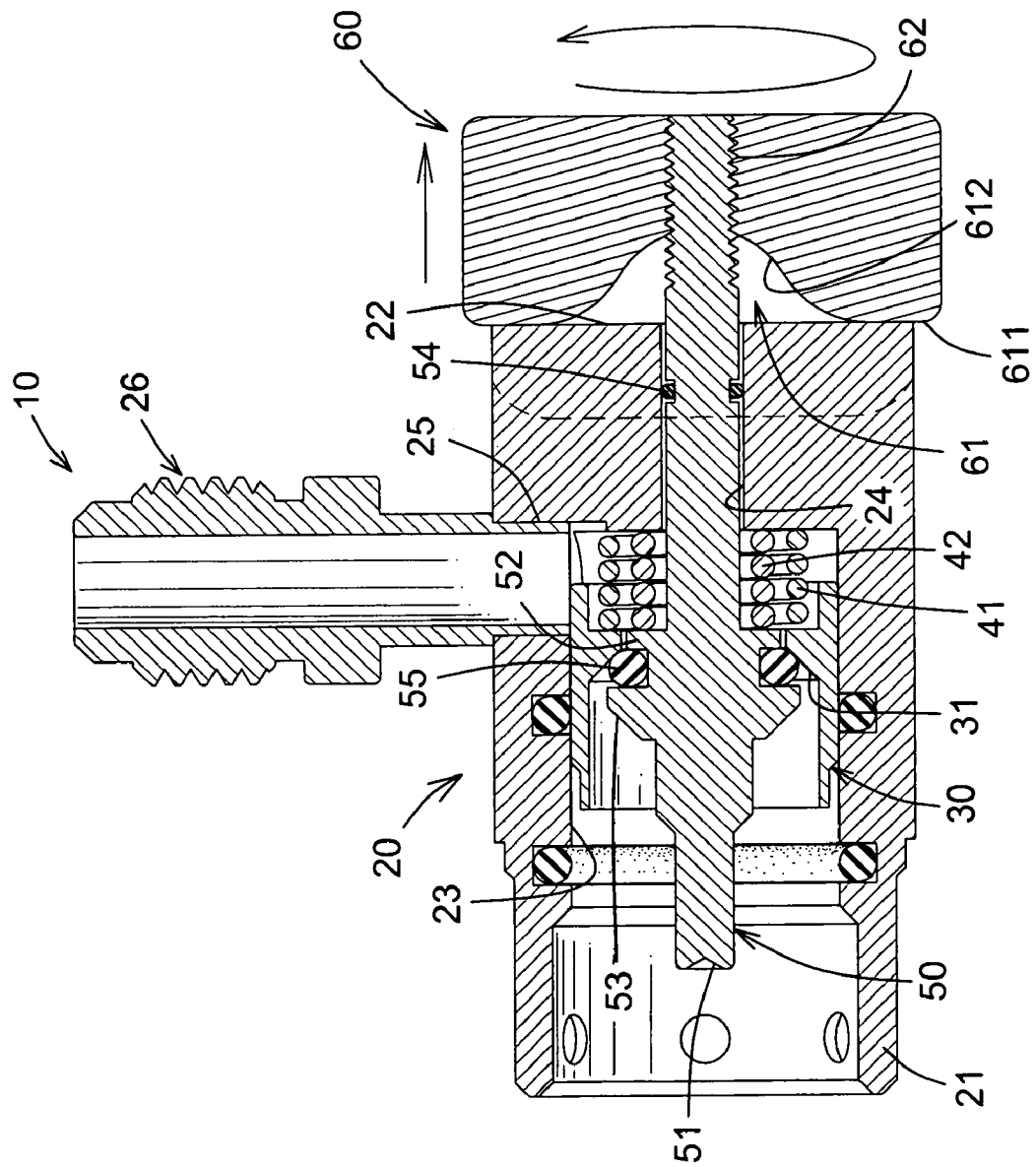
FIG. 3 is an operational cross sectional side view of the check valve actuator in FIG. 1 with the check valve actuator closed.

With further reference to FIG. 3, the body (20) is hollow and has a front end, a rear end, a top, a mounting collar (21), a convex ridge (22), an internal cavity (23), a through hole (24), a discharge port (25) and a discharge fitting (26). The mounting collar (21) is tubular, is formed on and protrudes longitudinally from the front end of the body (20) and has an internal surface. The convex ridge (22) is formed diametrically across and protrudes from the rear end of the body (20). The internal cavity (23) is formed inside the body (20) and has a closed rear wall. The through hole (24) is formed coaxially through the rear end of the body (20) and communicates with the internal cavity (23). The discharge port (25) is formed in the top of the body (20) and communicates with the internal cavity (23). The discharge fitting (26) is a tube, is mounted in the discharge port (25) and communicates with the internal cavity (23).

The sliding seat (30) is tubular, is mounted slidably in the internal cavity (23) against the internal surface of the internal cavity (23) and has an inner end, an internal surface and an annular seat (31). The inner end of the sliding seat (30) communicates with the discharge port (25). The annular seat (31) is formed on and protrudes radially in from the internal surface of the sliding seat (30) near the inner end of the sliding seat (30) and has an inner shoulder, an outer inclined seat and a through hole. The through hole is formed coaxially through the annular seat (31) and has an inner diameter.

The drive shaft (50) is slidably mounted coaxially in the internal cavity (23) of the body (20) through the sliding seat (30) and the through hole (24) in the body (20) and has a front end (51), a threaded rear end, an annular flange (52), an annular disk (53), an annular groove, a shaft O-ring (54) and a disk O-ring (55). The annular flange (52) is formed around and protrudes radially out from the drive shaft (50) and has a diameter smaller than the inner diameter of the through hole in the annular seat (31). The annular disk (53) is formed around and protrudes radially out from the drive shaft (50) slightly forward of the annular flange (52) and has a diameter larger than the inner diameter of the through hole in the annular seat (31). The annular groove is formed around the drive shaft (50) between the annular flange (52) and the threaded end of the drive shaft (50). The shaft O-ring (54) is mounted in the annular groove and seals the through hole (24). The disk O-ring (55) is mounted between the annular flange (52) and the annular disk (53) and selectively presses against the outer inclined seat of the annular seat (31) to close and seal the through hole in the annular seat (31).

The spring assembly (40) is mounted around the drive shaft (50), abuts the closed rear wall of the internal cavity (23), presses the sliding seat (30) and the drive shaft (50) forward and has a sliding seat spring (41) and a drive shaft spring (42). The sliding seat spring (41) is mounted against the inner shoulder of the annular seat (31) and presses the annular seat (31) forward and has a diameter. The drive shaft spring (42) is mounted inside the sliding seat spring (41) against the annular flange (52) on the drive shaft (50) and presses the drive shaft (50) forward and has a diameter smaller than the diameter of the sliding seat spring (41).

The knob (60) is attached to the threaded rear end of the drive shaft (50), presses against the rear end of the body (20) by the drive shaft spring (42) pressing the drive shaft (50) forward and has a front end, a rear end, a contact surface (61), a center and a threaded hole (62). The contact surface (61) is formed on the front end of the knob (60), corresponds to the rear end of the body (20), is connected to the drive shaft (50) and has a diametric groove (612) and two flat surfaces (611). The diametric groove (612) corresponds to the convex ridge (22) on the rear end of the body (20).

Figure 4:
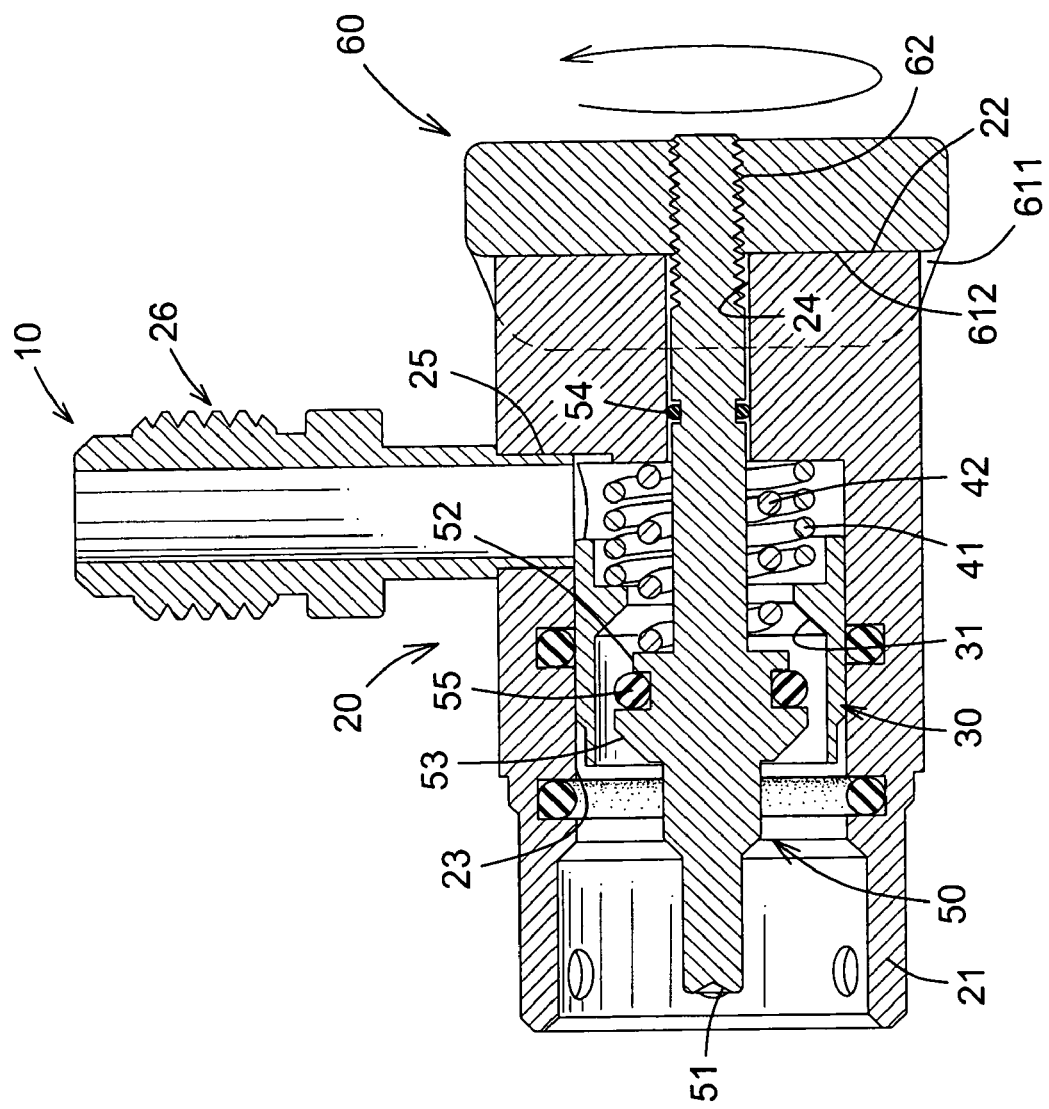
FIG. 4 is an operational cross sectional side view of the check valve actuator in FIG. 1 with the check valve actuator open.
Figure 5:
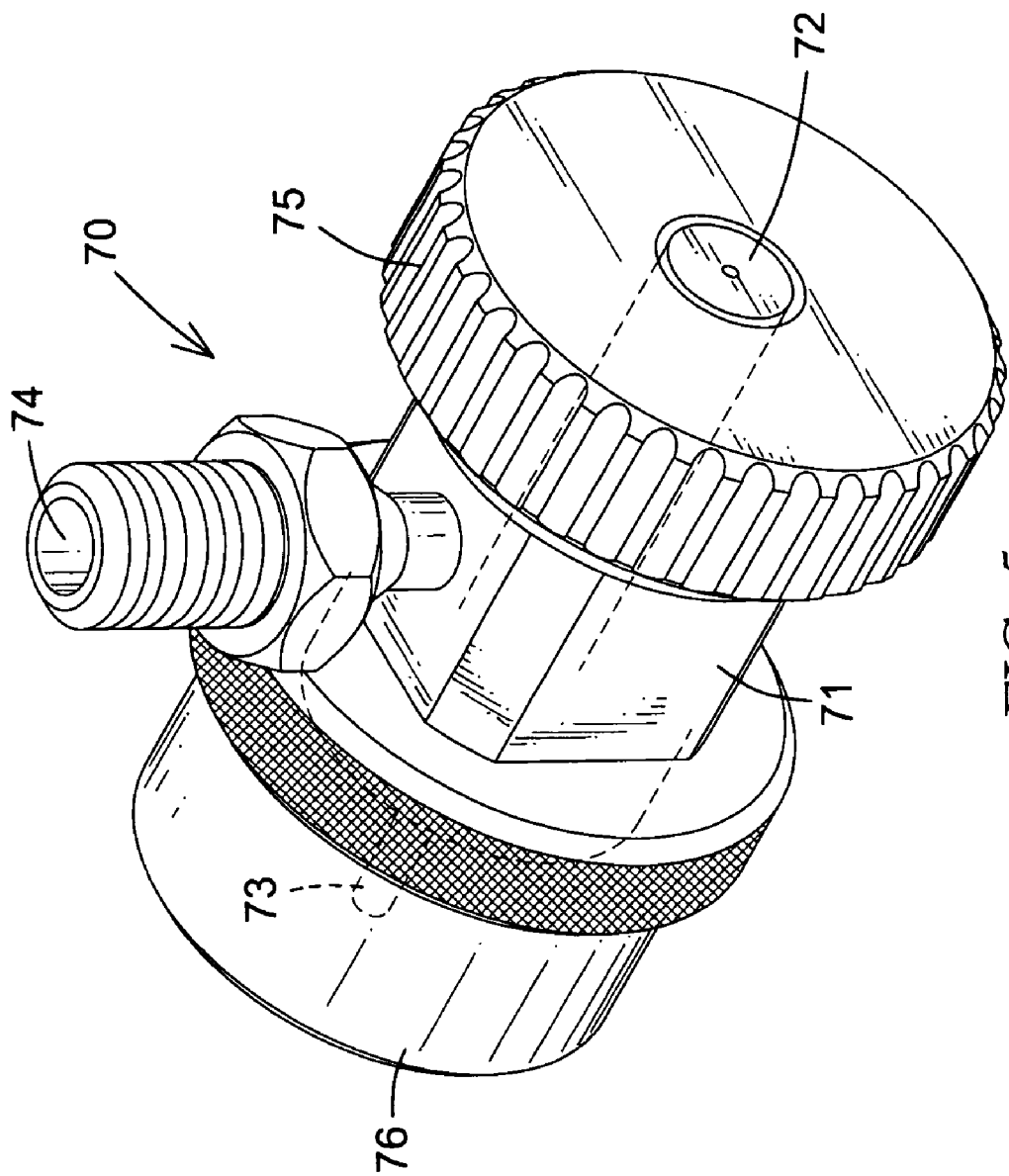
FIG. 5 is a perspective view of a conventional check valve actuator in accordance with the prior art.

With further reference to FIG. 4, turning the knob (60) and aligning the diametric groove (612) with the convex ridge (22) allows the drive shaft (50) to move forward. The disk O-ring (55) is pressed away from the outer inclined seat of the annular seat (31) by the drive shaft spring (42) which opens a path to the discharge port (26) in the body (20) and to the discharge fitting (26) and presses the front end (51) of the drive shaft (50) against an attached check valve to allow a substance to flow through the check valve actuator (10).

The flat surfaces (611) are formed on the front end of the knob (60) adjacent to the diametric groove (612). With further reference to FIG. 3, turning the knob (60) causes the flat surfaces (611) to press against the convex ridge (22) and pull the drive shaft (50) toward the rear end of the body (20). The front end (51) of the drive shaft (50) is retracted from the attached check valve, which allows the check valve to close. The disk O-ring (55) is also pulled securely against the outer inclined seat of the annular seat (31) to close the path through the check valve actuator (10) and prevent leaks through the check valve actuator (10).

The threaded hole is formed through the center of the knob (60) and screws onto the threaded rear end of the drive shaft (50) to securely attach the knob (60) to the drive shaft (50).

The check valve actuator (10) has the following advantages.

1. The knob (60) only has to be turned a quarter turn to open or close a check valve, such that the operation of the check valve actuator (10) is convenient and easy.

2. The spring assembly (40) provides a cushioning effect to keep the drive shaft (50) from damaging the check valve.

3. The annular disk (53), the disk O-ring (55) and the outer inclined seat on the annular seat (31) provide valve redundancy when the check valve is closed, which makes operation of the combined check valve and check valve actuator (10) more reliable and safer.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A check valve actuator having
    a body being hollow and having
        a front end;
        a rear end;
        a top;
        a mounting collar being tubular, formed on and protruding longitudinally from the front end of the body and having an internal surface;
        a convex ridge formed diametrically across and protruding from the rear end of the body;
        an internal cavity formed inside the body and having a closed rear wall;
        a through hole formed coaxially through the rear end of the body and communicating with the internal cavity;
        a discharge port formed in the top of the body and communicating with the internal cavity; and
        a discharge fitting being a tube, mounted in the discharge port and communicating with the internal cavity;
    a sliding seat being tubular, mounted slidably against the internal surface of the internal cavity and having
        an inner end communicating with the discharge port;
        an internal surface; and
        an annular seat formed on and protruding radially from the internal surface of the sliding seat near the inner end of the sliding seat end and having
            an inner shoulder;
            an outer inclined seat; and
            a through hole formed coaxially through the annular seat and having an inner diameter;
    a drive shaft slidably mounted in the internal cavity of the body through the sliding seat and the through hole of the body and having
        a front end;
        a threaded rear end;
            an annular flange formed around and protruding radially out from the drive shaft and having a diameter smaller than the inner diameter of the through hole in the annular seat;
            an annular disk formed around and protruding radially out from the drive shaft slightly forward of the annular flange and having a diameter larger than the inner diameter of the through hole in the annular seat;

an annular groove formed around the drive shaft between the annular flange and the threaded end of the drive shaft;

a shaft O-ring mounted in the annular groove to seal the through hole in the body; and a disk O-ring mounted between the annular flange and the annular disk and selectively pressing against the outer inclined seat of the annular seat; and a spring assembly mounted around the drive shaft, abutting the closed rear wall of the internal cavity, pressing the sliding seat and the drive shaft forward and having a sliding seat spring mounted against the inner shoulder of the annular seat and pressing the annular seat forward and has a diameter; and a drive shaft spring mounted inside the sliding seat spring against the annular flange on the drive shaft and pressing the drive shaft forward and has a diameter smaller than the diameter of the sliding seat spring; and a knob attached to the threaded rear end of the drive shaft, pressing against the rear end of the body and having a front end;

a rear end;

a contact surface formed on the front end of the knob, corresponding to the rear end of the body, connected to the drive shaft and having a diametric groove corresponding to the convex ridge on the rear end of the body; and two flat surface formed on the front end of the knob adjacent to the diametric groove;

a center; and a threaded hole formed through the center of the knob and screwing onto the threaded rear end of the drive shaft to securely attach the knob to the drive shaft.

* * * * *